United States Patent [19]

Barch et al.

[11] Patent Number: 4,941,904
[45] Date of Patent: Jul. 17, 1990

[54] METHOD AND APPARATUS FOR FORMING HOLLOW FIBERS

[75] Inventors: Herbert W. Barch, Natrona Heights; William P. Marshall, Pittsburgh, both of Pa.

[73] Assignee: PPG Industries, Inc., Pittsburgh, Pa.

[21] Appl. No.: 367,908

[22] Filed: Jun. 19, 1989

[51] Int. Cl.⁵ .................................. C03B 37/075
[52] U.S. Cl. ................................ 65/1; 65/2; 65/86; 425/DIG. 217
[58] Field of Search ............... 65/1, 86, 88, 2; 425/DIG. 217

[56] References Cited

U.S. PATENT DOCUMENTS

| | | | |
|---|---|---|---|
| 1,653,848 | 12/1927 | Grotta | 65/86 |
| 1,975,737 | 10/1934 | Sanchez-Vello | 65/86 |
| 3,190,739 | 6/1965 | Wilson | 65/86 X |
| 3,930,830 | 1/1976 | Yoshikawa et al. | 65/86 X |
| 4,846,864 | 7/1989 | Huey | 65/1 |

Primary Examiner—Robert L. Lindsay
Attorney, Agent, or Firm—Richard E. Maebius

[57] ABSTRACT

The instant invention relates to a method and apparatus for the production of hollow glass fibers using a novel tip design. It is believed that the success of the instant invention is due to the injection of pressurized gas to create a central lumen at distances farther removed from the terminus of the tip than taught possible by the prior art. This results in a more stable process and the production of hollow fibers having more uniform wall concentricity.

18 Claims, 1 Drawing Sheet

METHOD AND APPARATUS FOR FORMING HOLLOW FIBERS

The present invention relates to the formation of hollow fibers. More particularly, the invention relates to a method and apparatus for forming glass fibers which have a hollow lumen running throughout their length. Still more particularly, the present invention relates to a method of producing hollow fibers from a molten glass source using a unique tip having a central gas delivery tube designed to temporarily retard the flow of molten glass through the tip.

BACKGROUND OF THE INVENTION

In U.S. Pat. Nos. 3,268,313; 3,421,873 and 3,510,393 by Burgman. et. al, processes and devices were disclosed for forming hollow glass fibers or filaments (hereinafter referred to simply as "fibers").

The usual glass fiber is solid in its cross section and is drawn from a source of molten glass that is passed as a stream through an orifice known as a tip. Upon exiting the tip, the glass assumes the form of a cone and is then cooled and attenuated. In modern processes, as many as 4,000 or more solid fibers may be drawn at the same time from an electrically heated container known as a bushing which has a corresponding number of individual tips thereon. The individual fibers are usually gathered into a single strand which is then wound onto a rotating forming tube. A binder or size is generally applied to the fibers as they are being drawn, but prior to their being gathered, in order to retain them in the configuration of a strand.

Hollow fibers are produced in much the same manner as solid ones except that special tips are employed. As described in the aforementioned patents these tips generally have a hollow tube located concentrically within them through which pressurized gas, usually air, is injected. As the glass is being drawn into a fiber, air exiting from the discharge end of the delivery tube forms a hollow cavity or lumen in the center of the glass stream. As the glass is further attenuated and simultaneously solidified, the lumen is retained.

The hollow delivery tubes utilized in the Burgman, et. al patents were tapered inwardly at an angle of approximately 12° toward their centerline beginning at a point positioned slightly above and inside the terminus of the tip. Satisfactory hollow fibers could be produced if the discharge end of the tube terminated at a distance somewhere between 0.030 and 0.066 inches below the terminus of the tip. Extending the tube beyond the distance of 0.066 inches, as recited in U.S. Pat. Nos. 3,268,313 and 3,510,393, resulted in a situation where the glass necked down rapidly over the tube and fibers having very thin and unstable walls were produced. Attempts to overcome this effect by increasing the pressure of the air used to form the lumen often resulted in rupturing the glass cone. On the other hand, if the discharge end of the tube terminated at a position too close to the exit of the tip, fibers that were intermittently hollow and having relatively thick walls were produced. Careful attention to the amount of air pressure used to create the lumen was also required. If the air pressure became too low, molten glass would tend to wick up inside the tip and cause it to plug. Furthermore, if the tube became displaced from a position other than absolutely parallel and concentric with respect to the centerline of the tip, then eccentric hollow fibers that had extremely large wall thickness variations around their circumference were produced.

Some solutions to the problem of producing hollow fibers having a more uniform wall thickness or concentricity were suggested by the utilization of a special bushing having delivery tubes such as those described in U.S. Pat. Nos. 4,698,082; 4,735,642 and 4,758,259 by Jensen, et al., all of which have been issued to the same assignee as the subject matter of the instant invention. The teachings of the above references show the positioning of counter bored gas discharge tubes at substantially the same elevation as the terminus of the tips. It should be noted that, in this kind of configuration, molten glass exiting from the tip completely engulfs the discharge tube. Although more uniform hollow fibers can be produced using this method, the tube still must be maintained in a perfectly concentric position with respect to the tip and careful attention to the air pressure is still required in order to insure that the glass does not wick back up into the tube or exceed the ability of the surface tension to contain it, thus resulting in a rupture of the glass cone.

Therefore, there still exists a need to develop a method and apparatus for the production of hollow glass fibers which have a high degree of concentricity along with a process less sensitive to some of the problems associated with variations in the pressure used to create the lumen.

The instant invention overcomes some of these problems by using gas delivery tubes that temporarily retard the flow of molten glass through the tip and which extend much farther beyond the terminus of the tip than previously taught in the prior art.

SUMMARY OF THE INVENTION

In accordance with the instant invention, a plurality of hollow fibers may be produced from a source of molten material such as glass. In particular, one or more streams of molten glass are fed through a number of hollow tips or orifices (hereinafter referred to as "tips") located on the bottom of a special bushing assembly. A pure gas or other gaseous mixture is passed through a hollow gas delivery tube located concentrically inside each of these tips. The gas is injected into each stream of molten glass at a point somewhere beyond the terminus of the tip whereby a central lumen is formed. In particular, a gas, or gaseous mixture such as air, may be injected at a distance anywhere up to 0.176 inches or farther beyond the terminus of the tip depending upon the particular characteristics of the glass composition used. Both the glass and lumen are then attenuated and solidified by cooling to produce a hollow fiber.

In one embodiment of the invention, the gas delivery tubes positioned inside of each orifice are of a substantially constant internal diameter but the discharge end, through which the gas exits, is flared or beveled outwardly at an angle up to about 30° from the vertical. In this embodiment, the tube may extend anywhere from an elevation in the same plane as the terminus of the tip, as disclosed in the aforementioned Jensen, et al. patents, up to a distance of 0.176 inches or more beyond the tip terminus.

BRIEF DESCRIPTION OF THE DRAWINGS

For a more complete understanding of the present invention, reference is made to the accompanying drawings.

DETAILED DESCRIPTION OF THE DRAWING

Figure 1:
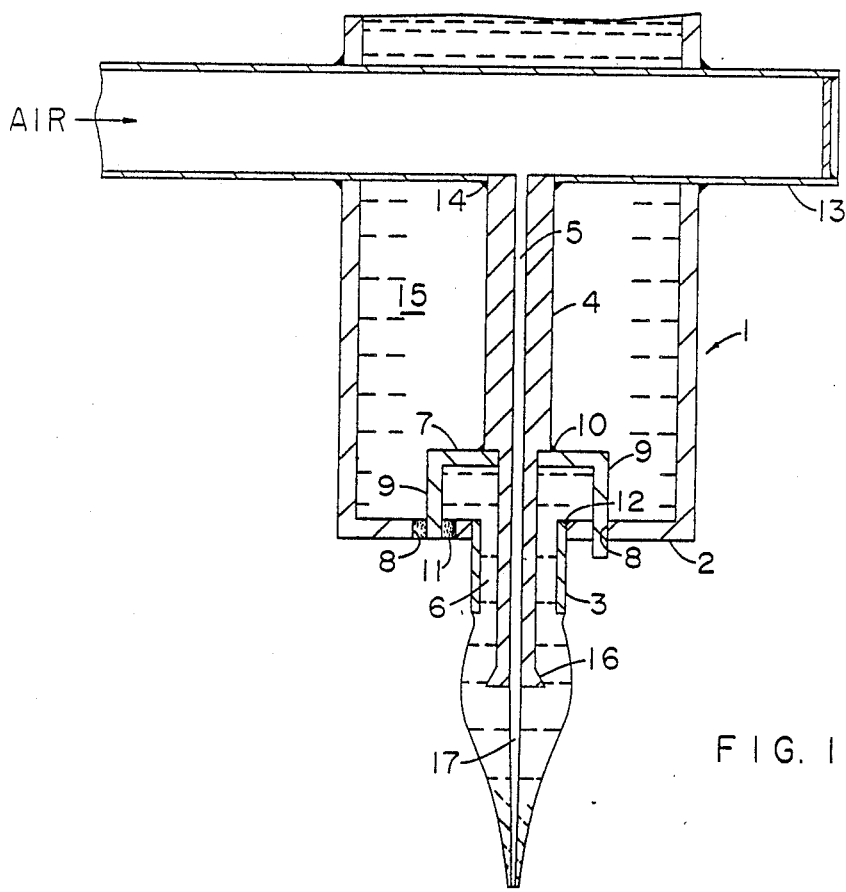
FIG. 1, is a side elevation view of a bushing having a single tip suitable for the production of a hollow glass fiber.

With the reference to FIG. 1 there is shown a bushing (1) having a tip plate or bottom member (2) (hereinafter referred to as the "tip plate"), in which is positioned a bushing tip (3). While only one tip is shown on this particular tip plate, it will be readily understood by one skilled in the art that a plurality of such tips may also be employed. In a typical hollow fiber bushing, the number of tips used may range anywhere from 1 to 200 or more.

Positioned concentrically within the inner walls of the tip (3) is a gas delivery tube (4) having a central bore (5) in communication with a manifold (13) similar to that disclosed in the aforementioned patents by Jensen, et al.

Figure 2:
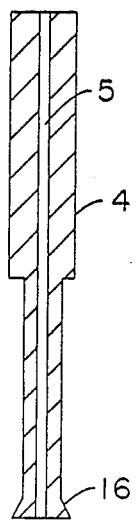
FIGS. 2, 3 and 4 are cross sectional views of various gas delivery tubes which can be employed in the practice of the instant invention.

In the preferred embodiment, as illustrated in FIGS. 1 and 2, the delivery tube (4) is machined from a single piece of suitable precious metal bar stock and the discharge end is beveled outwardly at an angle of up to 30° from the centerline so that it will terminate with an outside diameter less than or equal to the inside diameter of the tip. The discharge end (16) of the delivery tube may then be positioned as far as 0.176 inches or more below the terminus of the tip and a suitable gas injected to create the lumen (17).

The exact position of the discharge end of the delivery tube with respect to the terminus of the tip will depend on the particular glass composition used and the temperature at which an appropriate viscosity suitable for the attenuation of fibers can be achieved.

Several glass compositions are capable for use in the production of hollow fibers. "E-glass" compositions have been widely used as well as a composition such as "621-glass". Both of these compositions have been disclosed in U.S. Pat. Nos. 2,334,961 and 2,571,074, respectively. Boron and fluorine-free glass compositions such as those disclosed in U.S. Pat. Nos. 4,542,106; 3,847,626; 3,847,627; 3,876,481 and 4,026,715 may also be used. A borosilicate glass composition having between 30–60 percent $B_2O_3$; 30–65 percent $SiO_2$; 0–4 percent $Al_2O_3$ and anywhere from 1 to 10 percent alkali metal or earth alkali metal oxides such as those from the group consisting of sodium, potassium, lithium, magnesium and calcium may also be used. In addition to this, up to 5 percent of a metal oxide such as $ZrO_2$, $TiO_2$ or $Fe_2O_3$ may be included. A more detailed description of such compositions may be found in U.S. Pat. No. 4,748,121 by Beaver, et al. (All percentages in the above have been expressed using the weight of the particular glass composition involved as the basis.)

In the construction of the bushing, a bracket member (7) is provided around the external surface of the delivery tube (4). Holes (8) are provided in tip plate (2) and side pieces or tabs (9) belonging to the bracket member (7) are inserted through the holes (8) and through the tip plate (2). One of these tabs is shown inserted through the hole (8) on the right hand side of FIG. 1. After insertion, welding causes the tab to melt (11), thereby becoming an integral part of the tip plate. (In its finished form, the tab (9) extending through the tip plate on the right-hand side of FIG. 1 will look the same as that shown on the left.) The upper portion of the bracket (7) is secured to the outer wall of the delivery tube (4) by a weld (10). The upper end of the delivery tube is in turn secured to the manifold (13) by another weld (14). The individual tips (3) may be welded (12) to the tip plate or formed using the conventional cold drawing or "coining" process described in the book entitled "The Manufacturing Technology of Continuous Glass Fibers", by K. L. Lowenstein, Elsevier Publishing Co., 1973, at pages 95–97.

The bushing (1) itself is electrically heated by means of a current applied through suitable connectors to an electrical terminal on each of two opposite sides of the bushing. This arrangement is well understood by those skilled in the art and is described in Lowenstein, supra, at pages 110–114.

The bushing (1) may be constructed of any suitable material permitted by the current state of the art. Typically, bushings are constructed of precious metals such as platinum and platinum-rhodium alloys. Grain stabilized platinum or alloys thereof may also be employed. An alloy having 80 percent platinum and 20 percent rhodium by weight is commonly used. This same alloy is used for the construction of all other bushing components that come in direct contact with the molten glass such as the delivery tubes, tips and so forth. Generally, any surface in direct contact with molten glass is usually made from a platinum-rhodium alloy or some other precious metal. Further details of hollow fiber bushing construction can be found in the aforementioned patents by Jensen, et al.

In the operation of the instant invention, molten glass (15) flows downwardly through the annular region (6) created between the inner wall of the tip (3) and the delivery tube (4). As the glass exits into the atmosphere, a pressurized stream of gas, preferably air, is passed into the manifold (13) and through the central bore (5) of the delivery tube (4). The gas then exits directly into the stream of molten glass through the discharge end of the delivery tube whereby a central lumen (17) is formed. As the glass stream is further attenuated and cooled, the lumen is elongated and retained throughout the length of the resulting hollow fiber.

Successful drawing of glass fibers requires that the glass be within a narrow range of viscosities, i.e., generally between 500 to 1,000 poise as reported by Lowenstein, supra, at page 89 although fiberization is also possible within the slightly broader range of 300 to 2,500 poise as well. The exact temperature necessary to achieve a given viscosity will, of course, depend upon the specific glass composition used. It is well known for example, that the $B_2O_3$ content of the glass can markedly alter its viscosity/temperature characteristics. See Lowenstein, supra, at pages 70–71.

In one example, a borosilicate glass, such as the aforementioned "621" glass at a melt temperature of 2325° F. was passed through a tip as described herein for the production of a hollow fiber. The delivery tube (4) had an inside diameter or bore of 0.020 inches and an outside diameter of 0.055 inches although a central bore of up to 0.040 inches may also be used. The tip had an inside diameter of 0.110 inches and an outside diameter of 0.140 inches. The discharge end of the tube was machined so that it beveled outward at an angle of 30° from the vertical as illustrated in FIG. 2 and had a final outside diameter of 0.075 inches. The discharge end was then positioned at an elevation 0.156 inches beneath the terminus of the tip. Air with a pressure equivalent to a water column of 6 inches, or roughly 0.225 psig, was injected although air pressures equivalent to anywhere from 1 to 10 inches of water were also used. The bushing was operated continuously and produced hollow fibers having an outside diameter typically in the range of 35 to 38 microns with the internal diameter of the lumen ranging between 24 and 25 microns. The fibers which were produced had average wall concentricities ranging between 92 and 99 percent.

It is believed that the instant invention results in an improvement in the concentricity of the hollow fibers created therefrom because the formation of the lumen takes place at a position where the glass has a lower temperature than it would if it were in the immediate vicinity of the tip. Extending the delivery tube beyond the terminus of the tip allows the glass to cool slightly so that the resulting viscous forces are stronger and thus increase the stability of the forming process by effectively making the glass more visco-elastic and better able to tolerate variations in the air pressure used to form the lumen.

In the preferred embodiment, it is believed that in the use of the beveled delivery tube depicted in FIG. 2, as the glass flows downwardly through the annular region of the tip and over the outer surface of the tube, it cools and thus the flow is slowed by the increase of the viscosity. When the glass encounters the beveled edge of the delivery tube, the combination of surface tension and viscous forces tends to make it slow even more which results in a localized build-up or "bulge" of glass in this area. This "bulge" is more clearly depicted in FIG. 1. Because the flow of the glass is slightly retarded, further cooling occurs and a higher viscosity is reached than would otherwise take place over the same length of a straight or tapered delivery tube.

It was also found that the use of a beveled delivery tube produced fibers having good wall concentricities even when the tube was displaced from the vertical so that it was not perfectly aligned or concentrically positioned within the tip, contrary to the teachings of the prior art which required a perfectly concentric configuration to be maintained.

Figure 3:
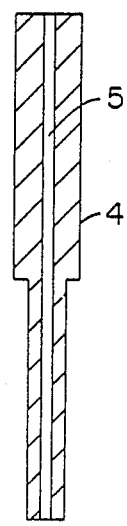
Figure 4:
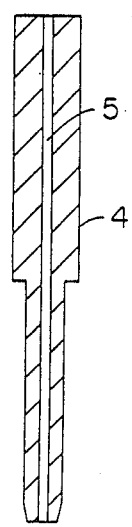

Although the beveled tube illustrated in FIG. 2 is the preferred embodiment used in the instant invention, more conventional straight and tapered tubes as illustrated in FIGS. 3 and 4 may also be used. These tubes may extend anywhere from a distance greater than 0.066 inches up to about 0.176 inches or more beyond the terminus of the tip depending, of course, upon the characteristics of the particular glass composition used.

While this invention has been described with reference to certain methods, illustrative embodiments, and examples it is not intended that it be so limited thereby, except insofar as appears in our accompanying claims.

We claim:

1. A method for producing a plurality of hollow glass fibers, comprising the steps of: feeding molten glass through a plurality of tips, supplying a pressurized gas or gaseous mixture through a delivery tube located concentrically within each said tip, injecting said gas or gaseous mixture into said molten glass through the discharge end of each said delivery tube at a distance greater than 0.066 inches beyond the terminus of each said tip up to a distance beyond which the formation of a hollow lumen is no longer possible inside said molten glass, attenuating, and simultaneously cooling said molten glass so as to produce a hollow glass fiber from each said tip.

2. The method of claim 1 wherein the gaseous mixture is air.

3. The method of claim 1 wherein both the outside and inside diameter of each said delivery tube is substantially constant.

4. The method of claim 1 wherein the discharge end of each said delivery tube is beveled outwardly at an angle of up to 30° as measured from the vertical centerline thereof.

5. The method of claim 1 wherein the discharge end of each said delivery tube is tapered inward at an angle of up to 12° as measured from the vertical centerline thereof.

6. An apparatus for the production of a plurality of hollow glass fibers comprising: a source of molten glass, a further source of pressurized gas, a bushing assembly having a tip plate from which a plurality of tips extend downwardly therefrom, a plurality of gas delivery tubes each having a central bore, each tube being located in a substantially concentric position within each of said tips and extending therethrough thereby causing the open cross section of each said tip to be restricted to the form of an annulus to allow the passage of an individual stream of said molten glass, each of said delivery tubes also extending a distance greater than 0.066 inches beyond the terminus of each said tip up to a distance beyond which the formation of a hollow fiber is no longer possible, and means for connecting each of said delivery tubes to said source of pressurized gas whereby said gas is discharged through the central bore of each said tube directly into each individual stream of molten glass surrounding it whereby a central lumen is formed and a hollow glass fiber is attenuated from each of said individual tips.

7. The apparatus of claim 6 wherein both the outside and inside diameter of each said delivery tube is substantially constant.

8. The apparatus of claim 6 wherein the discharge end of each said delivery tube is beveled outwardly at an angle of up to 30° as measured from the vertical centerline thereof.

9. The apparatus of claim 6 wherein the discharge end of each said delivery tube is tapered inward at an angle of up to 12° as measured from the vertical centerline thereof.

10. The apparatus of claim 6 wherein said gas is pressurized air.

11. The method of claim 4 wherein the outside diameter of the discharge end of each said delivery tube is at least equal to the inside diameter of each said tip.

12. The apparatus of claim 8 wherein the outside diameter of the discharge end of each said delivery tube is at least equal to the inside diameter of each said tip.

13. An apparatus for the production of a plurality of hollow glass fibers comprising: a supply of molten glass; a further supply of gas; a bushing having a tip plate from which at least one tip extends downwardly therefrom, said bushing being in communication with, and able to receive said molten glass; at least one gas delivery tube having a central bore, each said gas delivery tube located in a substantially concentric position within each said tip and the terminal end of said tube extending therethrough, thereby restricting the opening of each said tip to the form of an annulus to allow the passage of a stream of molten glass, each said delivery tube terminating at a distance greater than 0.066 inches beyond the terminus of each said tip up to a distance beyond which the formation of a hollow fiber is no longer possible; and, means for operatively connecting each said delivery tube so as to receive said supply of gas whereby said gas passes through the central bore of each said tube and enters the stream of molten glass passing around it thereby forming a lumen to permit the subsequent attenuation of a hollow glass fiber from each said tip.

14. The apparatus of claim 13 wherein the terminal end of each delivery tube is beveled outwardly at an angle of up to 30° as measured from the centerline thereof.

15. The apparatus of claim 14 wherein the outside diameter of the terminal end of each gas delivery tube is at least equal to the inside diameter of each said tip.

16. The apparatus of claim 13 wherein both the outside and inside diameter of each said delivery tube is substantially constant.

17. The apparatus of claim 13 wherein the discharge end of each said delivery tube is tapered inward at an angle of up to 12° as measured from the vertical centerline thereof.

18. The apparatus of claim 13 wherein said supply of gas is pressurized air which passes at a pressure greater than atmosphere into each said stream of molten glass.

* * * * *